(12) United States Patent
Onouchi et al.

(10) Patent No.: US 12,189,066 B2
(45) Date of Patent: Jan. 7, 2025

(54) PHOTON COUNTING CIRCUIT, RADIOGRAPHIC IMAGING APPARATUS, AND THRESHOLD SETTING METHOD

(71) Applicant: FUJIFILM Healthcare Corporation, Kashiwa (JP)

(72) Inventors: Masafumi Onouchi, Kashiwa (JP); Isao Takahashi, Kashiwa (JP)

(73) Assignee: FUJIFILM Corporation, Tokyo (JP)

( * ) Notice: Subject to any disclaimer, the term of this patent is extended or adjusted under 35 U.S.C. 154(b) by 363 days.

(21) Appl. No.: 17/863,561

(22) Filed: Jul. 13, 2022

(65) Prior Publication Data
US 2023/0062043 A1 Mar. 2, 2023

(30) Foreign Application Priority Data
Sep. 1, 2021 (JP) ................................. 2021-142211

(51) Int. Cl.
*G01T 1/17* (2006.01)
*G01T 1/164* (2006.01)

(52) U.S. Cl.
CPC ............ *G01T 1/171* (2013.01); *G01T 1/1647* (2013.01)

(58) Field of Classification Search
CPC .............................. G01T 1/171; G01T 1/1647
See application file for complete search history.

(56) References Cited

FOREIGN PATENT DOCUMENTS

JP 2011-085479 A 4/2011
WO WO-2018003918 A1 * 1/2018 ............... A61B 6/03

* cited by examiner

*Primary Examiner* — David P Porta
*Assistant Examiner* — Fani Polyzos Boosalis
(74) *Attorney, Agent, or Firm* — Paul Teng

(57) ABSTRACT

A photon counting circuit, a radiographic imaging apparatus, and a threshold setting method are provided, in which the photon counting circuit is capable of sufficiently reducing a difference between a target threshold value and a threshold value set for a pixel even if each pixel of a photon counting detector is divided into a plurality of subpixels. In the photon counting circuit for counting, for each pixel, electrical charges generated depending on photon energy of radiation applied to an object, a pixel is divided into a plurality of subpixels. When N is a natural number, a threshold value of each of the subpixels is selected from among top N discrete values of a plurality of discrete values arranged in order of proximity to a target threshold value corresponding to the photon energy so as to minimize a difference between the target threshold value and an average of the threshold values of the respective subpixels included in the pixel.

14 Claims, 16 Drawing Sheets

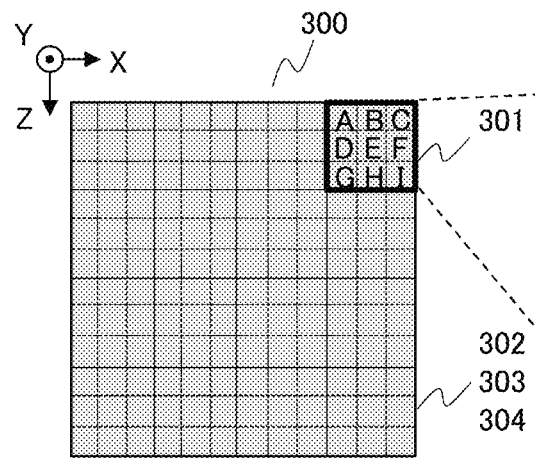
FIG.13A
FIG.13B
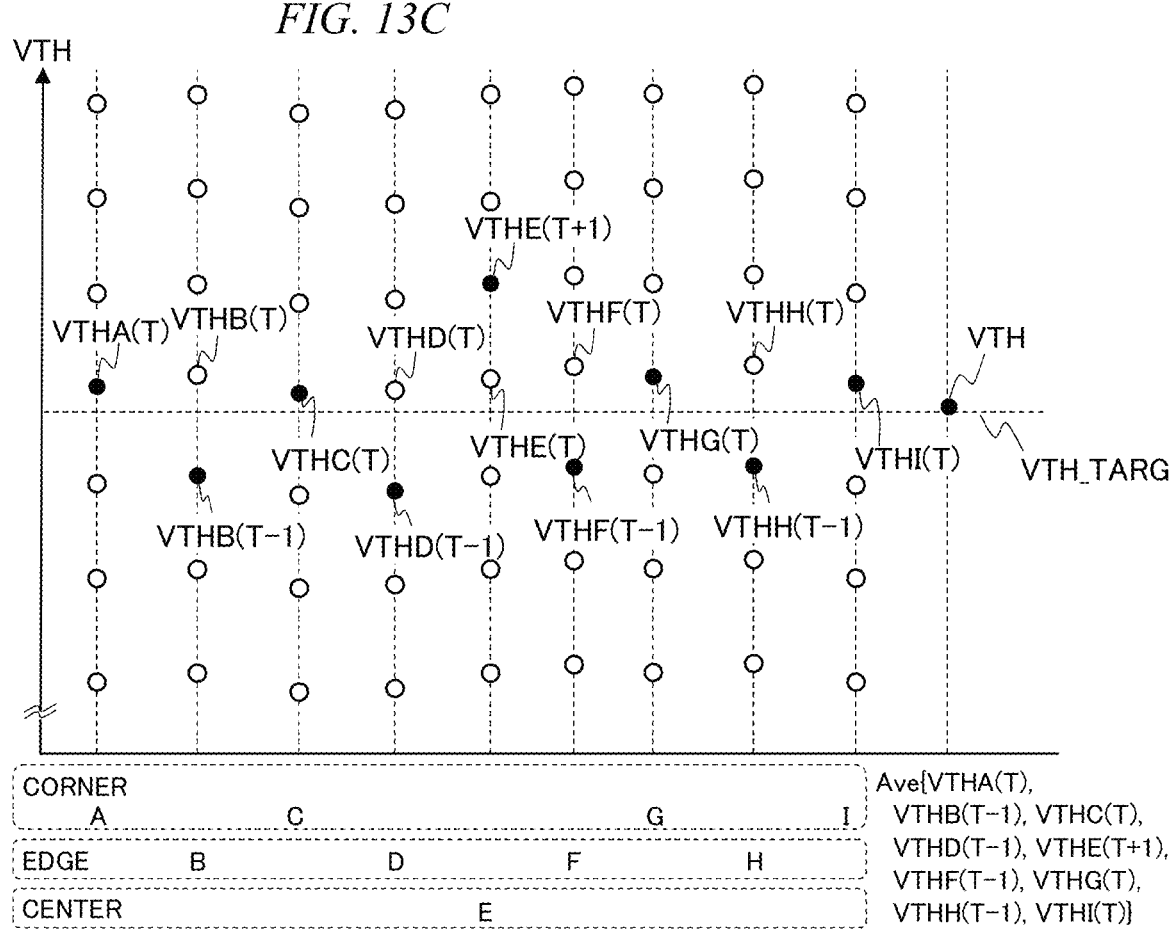
FIG. 13C

PHOTON COUNTING CIRCUIT, RADIOGRAPHIC IMAGING APPARATUS, AND THRESHOLD SETTING METHOD

CLAIM OF PRIORITY

The present application claims priority from Japanese Patent Application JP 2021-142211 filed on Sep. 1, 2021, the content of which is hereby incorporated by reference into this application.

BACKGROUND OF THE INVENTION

The present invention relates to a radiographic imaging apparatus equipped with a photon counting detector and, more particularly, to the setting of a threshold value of each pixel of the photon counting detector.

The photon counting detector has a semiconductor layer in which electrical charges are generated depending on the photon energy of incident radiation, and a photon counting circuit for counting the generated electric charges for each pixel. The photon counting detector counts individual photons and discriminates energy for each photon. Therefore, a photon counting CT (Computed Tomography) apparatus equipped with the photon counting detector is capable of obtaining more information as compared with a conventional CT apparatus equipped with a charge integration detector. In the photon counting circuit, a plurality of threshold values for discriminating photon energy is discretely set and each threshold value is required to be maintained at a high accuracy for photon energy.

Japanese Unexamined Patent Application Publication No. 2011-85479 discloses, for the purpose of accurate setting of each threshold value, the calculation of a threshold value of each pixel with uniform detection sensitivity using data on when radiation enters a certain pixel from a gamma ray source, and second count data on when radiation enters all pixels from an X-ray tube.

In Japanese Unexamined Patent Application Publication No. 2011-85479, however, no consideration is given to the case where each pixel in the photon counting detector is divided into a plurality of subpixels to improve the counting performance. Where a pixel is equally divided into a plurality of subpixels, an average of pixel-by-pixel threshold values is set as a threshold value of a pixel. One of a plurality of discrete values is selected as a threshold value of each subpixel. Therefore, even if a discrete value closest to a target threshold value corresponding to the photon energy is selected as a threshold value of each subpixel, the threshold value of each subpixel has a difference equal to half the interval between discrete values from the target threshold value at a maximum, so that the threshold value of a pixel is not always set to be equal to the target threshold value.

SUMMARY OF THE INVENTION

It is accordingly an object of the present invention to provide a photon counting circuit capable of sufficiently reducing the difference between a target threshold value and a threshold value set for a pixel even if each pixel of a photon counting detector is divided into a plurality of subpixels, as well as a radiographic imaging apparatus and a method for setting a threshold value.

To achieve the above object, an aspect of the present invention provides a photon counting circuit for counting, for each pixel, electrical charges generated depending on photon energy of radiation applied to an object, wherein a pixel is divided into a plurality of subpixels, and when N is a natural number, a threshold value of each of the subpixels is selected from among top N discrete values of a plurality of discrete values arranged in order of proximity to a target threshold value corresponding to the photon energy so as to minimize a difference between the target threshold value and an average of the threshold values of the respective subpixels included in the pixel.

Another aspect of the present invention provides a radiographic imaging apparatus that includes: a radiation source for irradiating an object with radiation; and a detection element module for detecting the radiation, wherein the detection element module has the above-described photon counting circuit.

Still another aspect of the present invention provides a threshold setting method for setting threshold values for subpixels of a radiographic imaging apparatus that includes a radiation source for irradiating an object with radiation and a detection element module having a photon counting circuit for counting, for each pixel, electrical charges generated depending on photon energy of the radiation, the pixel being divided into a plurality of the subpixels. The threshold setting method includes the step of: when N is a natural number, selecting a threshold value of each of the subpixels from among top N discrete values of a plurality of discrete values arranged in order of proximity to a target threshold value corresponding to the photon energy so as to minimize a difference between the target threshold value and an average of the threshold values of the respective subpixels included in the pixel.

According to the present invention, the photon counting circuit is provided which is capable of sufficiently reducing a difference between a target threshold value and a threshold value set for a pixel even if each pixel of a photon counting detector is divided into a plurality of subpixels, and the radiographic imaging apparatus and the threshold value setting method are also provided.

BRIEF DESCRIPTION OF THE DRAWINGS

FIGS. 13A, 13B and 13C are diagrams illustrating an example of how a threshold value is set according to a fifth embodiment of the present invention;

DETAILED DESCRIPTION OF THE PREFERRED EMBODIMENTS

Embodiments according to the present invention will now be described with reference to the accompanying drawings. A radiographic imaging apparatus according to present invention is applied to an apparatus including a radiation source and a photon counting detector. The following description provides an example where radiation is X rays and the radiographic imaging apparatus is an X-ray CT apparatus.

First Embodiment

Figure 1:
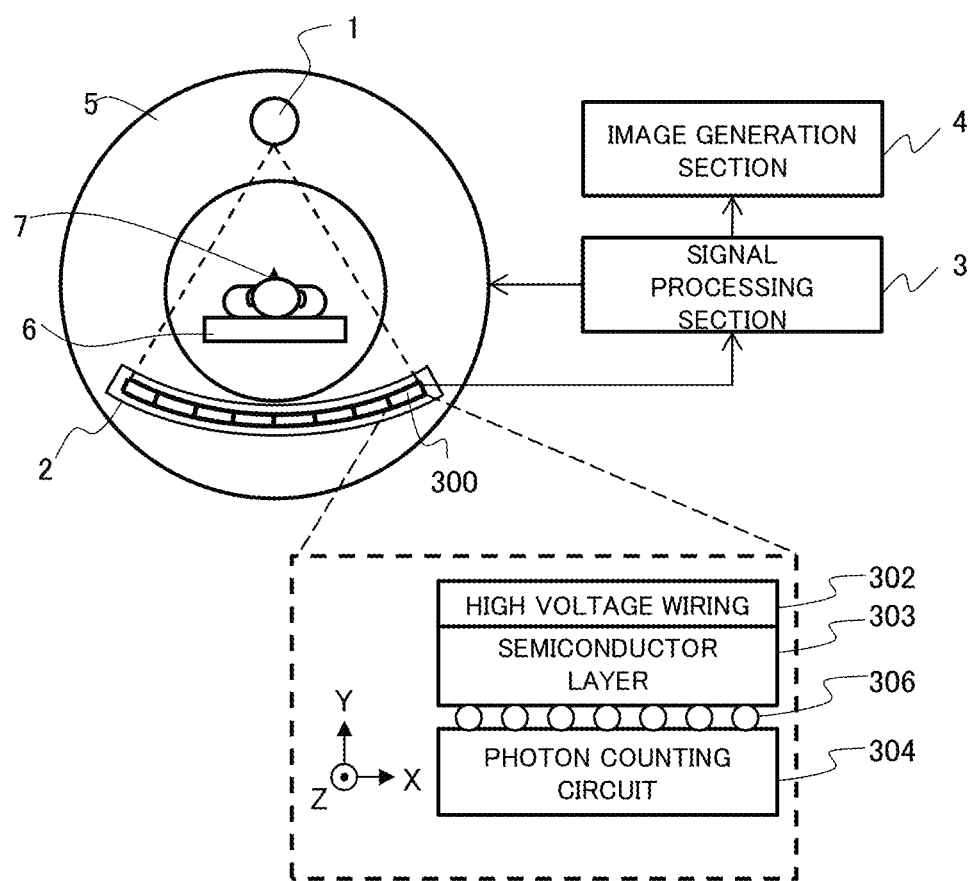
FIG. 1 is an overall configuration diagram of an X-ray CT apparatus to which the present invention is applied.

As illustrated in FIG. 1, an X-ray CT apparatus according to a first embodiment includes: an X ray source 1 for irradiating an object 7 with X rays; an X-ray detector 2 including a plurality of detection elements two-dimensionally arranged to detect X-ray photons; a signal processing section 3; and an image generation section 4. The detection elements are also referred to as pixels, and each pixel is divided into a plurality of subpixels in order to improve the counting performance. The signal processing section 3 performs processing for correction and/or the like on a detection signal output from the detection elements and controls each part of the X-ray CT apparatus. The image generation section 4 generates an image of the object 7 using the signal processed for correction and/or the like by the signal processing section 3. The X-ray source 1 and the X-ray detector 2 are configured to be supported on the opposite sides from each other by a rotating plate 5 to rotate around and relative to the object 7 laid on a bed 6.

The X-ray detector 2 is configured to include a plurality of detection element modules 300 arranged in an arc shape about the X-ray source 1. Each detection element module 300 is a photon counting detector and has high voltage wiring 302, a semiconductor layer 303, and a photon counting circuit 304. In FIG. 1, the Z axis is a direction of the rotating axis of the rotating plate 5, the Y axis is a direction of X-ray irradiation, and the X axis is a direction perpendicular to the YZ plane. Stated another way, the detection element modules 300 arranged in an arc shape have individually different Y and X axes.

The semiconductor layer 303 is made of, for example, cadmium zinc telluride (CZT), cadmium telluride (CdTe), and/or the like, and generates electric charges equivalent to the incident photon energy. The photon counting circuit 304 is connected to the semiconductor layer 303 through a plurality of pixel electrodes 306. The photon counting circuit 304 counts electric charges generated in the semiconductor layer 303 for each pixel, and outputs the count result as a count signal. The high voltage wiring 302 supplies high voltage to the semiconductor layer 303 to produce an electric filed between the semiconductor layer 303 and the pixel electrodes 306. Due to the electric field thus produced, the electric charges generated in the semiconductor layer 303 move to the photon counting circuit 304 via the nearest pixel electrodes 306 to be counted in the photon counting circuit 304.

While the X-ray source 1 and the X-ray detector 2 that are located opposite each other are rotating around the object 7, the X-ray irradiation from the X-ray source 1 and the detection of X rays passing through the object 7 by the X-ray detector 2 are repeated. The count signals output by the photon counting circuits 304 of the X-ray detector 2 are processed for correction and/or the like at the signal processing section 3, and then transmitted to the image generation section 4. The image generation section 4 generates a tomographic image, i.e., CT image of the object 7 based on the received signals. Further, the count signals output by the photon counting circuits 304 are discriminated on the basis of photon energy, thereby generating a CT image in each energy. For ensuring the image quality of the CT image in each energy, an accurate threshold value need to be set for discriminating energy in the photon counting circuit 304.

Figure 2A:
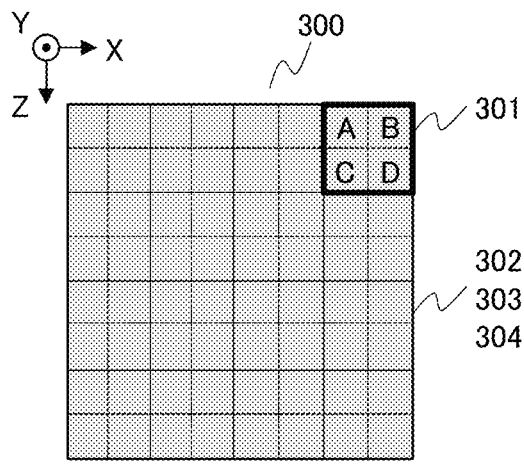
FIGS. 2A, 2B and 2C are diagrams illustrating the configuration of a detection element module, energy discrimination, and threshold setting.
Figure 2B:
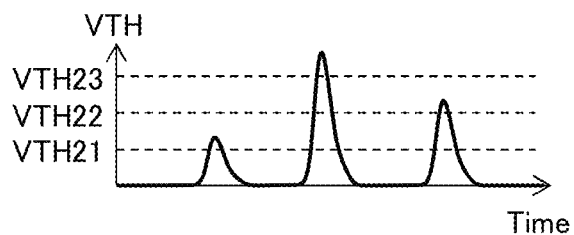
Figure 2C:
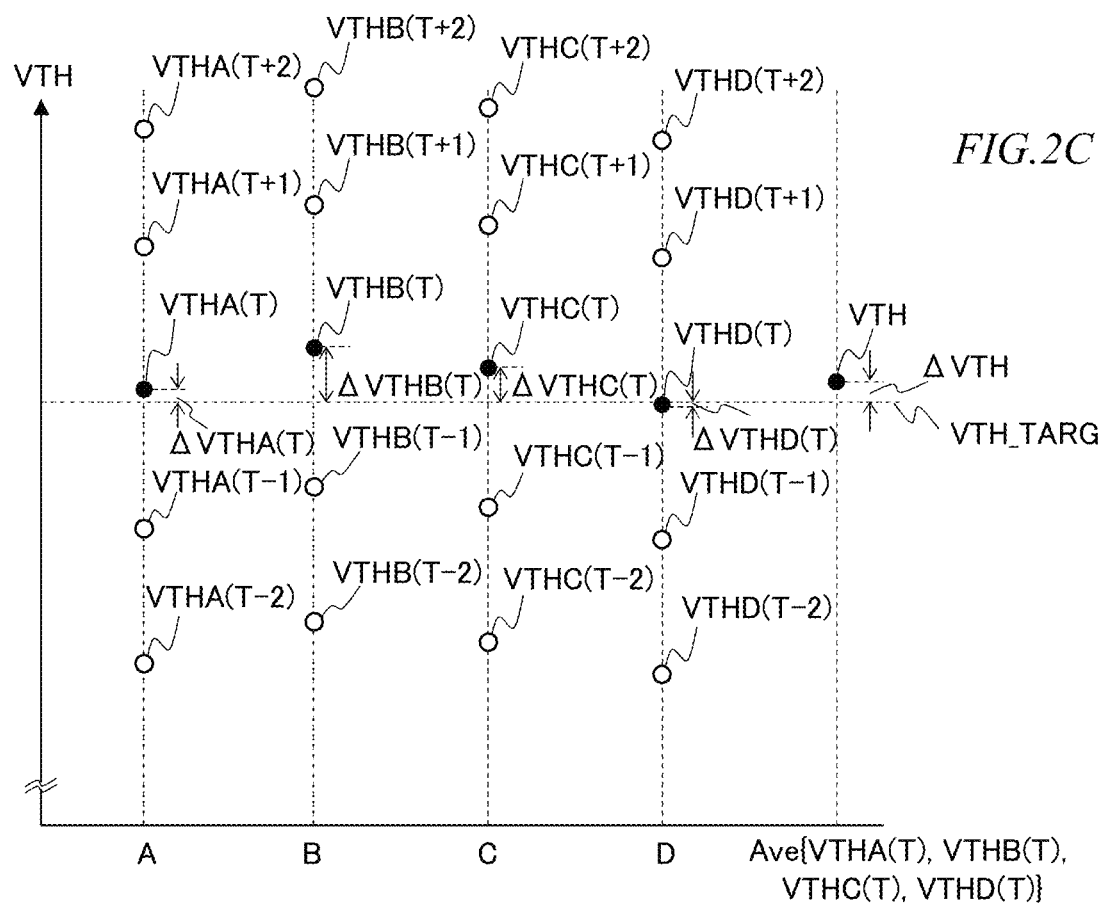

With reference to FIGS. 2A, 2B, and 2C, the configuration of the detection element module 300, the energy discrimination, and the threshold setting are described. FIG. 2A is a front view of the detection element module 300, FIG. 2B is a chart showing the relationship between electric pulses and threshold values, and FIG. 2C is a diagram illustrating the threshold setting for a pixel.

In the detection element module 300, the high voltage wiring 302, the semiconductor layer 303 and the photon counting circuit 304 are laminated in the Y axis direction. The detection element module 300 has pixels 301 arranged two-dimensionally on the XZ plane. Further, each of the pixels 301 is divided into a plurality of subpixels for the purpose of improving the counting performance. FIG. 2A illustrates an example of the detection element module 300 in which four pixels are arranged in the X direction, four pixels are arranged in the Z axis, and a pixel 301 is divided into 2-by-2 subpixels A, B, C, and D. The subpixels A, B, C, and D are identical in size and are connected respectively via the pixel electrodes 306 to the photon counting circuit 304.

The electric charges generated in the semiconductor layer 303 upon incidence of the X-ray photons are counted by the photon counting circuit 304 as an electric pulse with a peak value according to the X-ray photon energy. FIG. 2B shows three electric pulses arranged in the time direction and having the respective peak values slightly exceeding threshold values VTH21, VTH23, and VTH22 in this order. The photon counting circuit 304 includes a counter providing for a plurality of threshold values, and electric pulses with peak values exceeding the respective threshold values are counted by the counter. Minimization of the difference between a threshold value and a target threshold value corresponding to the X-ray photon energy is required for increasing the accuracy of measurement of X-ray photon energy.

With reference to FIG. 2C, a conventional method for setting a threshold value of a pixel is described. In FIG. 2C, the vertical axis represents threshold values and the horizontal axis represents subpixels A, B, C, D and a pixel 301 made up of the four subpixels A, B, C, D. As a threshold value of each subpixel A, B, C, D, one of a plurality of discrete values is selected. For example, for the subpixel A, one of the discrete values, VTHA(1), VTHA(2), . . . , VTHA(T−1), VTHA(T), VTHA(T+1), etc., arranged in this order, is selected as a threshold value. Intervals between discrete values for each subpixel are approximately equal although circuit characteristics vary. For example, VTHA (T+1)−VTHA(T)≈VTHA(T)−VTHA(T−1). The threshold value of the pixel 301 made up of the four subpixels is equal to an average of the threshold values for the four subpixels.

When a target threshold value corresponding to the X-ray photon energy is VTH_TARG, as a threshold value of each of the subpixels A, B, C, D, a discrete value closest to the target threshold value VTH_TARG is typically selected. Here, the discrete values closest to the target threshold value VTH_TARG in the respective subpixels A, B, C, D are assumed as VTHA(T), VTHB(T), VTHC(T), VTHD(T) and indicated with black dots. Differences between the target threshold value VTH_TARG and the threshold values set in the respective subpixels A, B, C, D are assumed as ΔVTHD(T), ΔVTHB(T), ΔVTHC(T), and ΔVTHD(T).

An absolute value of ΔVTHA(T), ΔVTHB(T), ΔVTHC(T), ΔVTHD(T) is half the interval between discrete values for each subpixel at a maximum. Therefore, even if a discrete value closest to the target threshold value is selected as a threshold value of each subpixel, a difference ΔVTH between the target threshold value VTH_TARG and the pixel threshold value VTH which is an average of the threshold values of the individual subpixels is not always minimized. That is, in a similar manner to the subpixels, the absolute value of ΔVTH can take the difference equal to half the interval between discrete values at a maximum. To address this, in the first embodiment, the threshold value for each subpixel is selected not only from the discrete value closest to the target threshold value but also from among all the remaining discrete values, in order to achieve a minimum difference between a pixel threshold value and a target threshold value.

Figure 3:
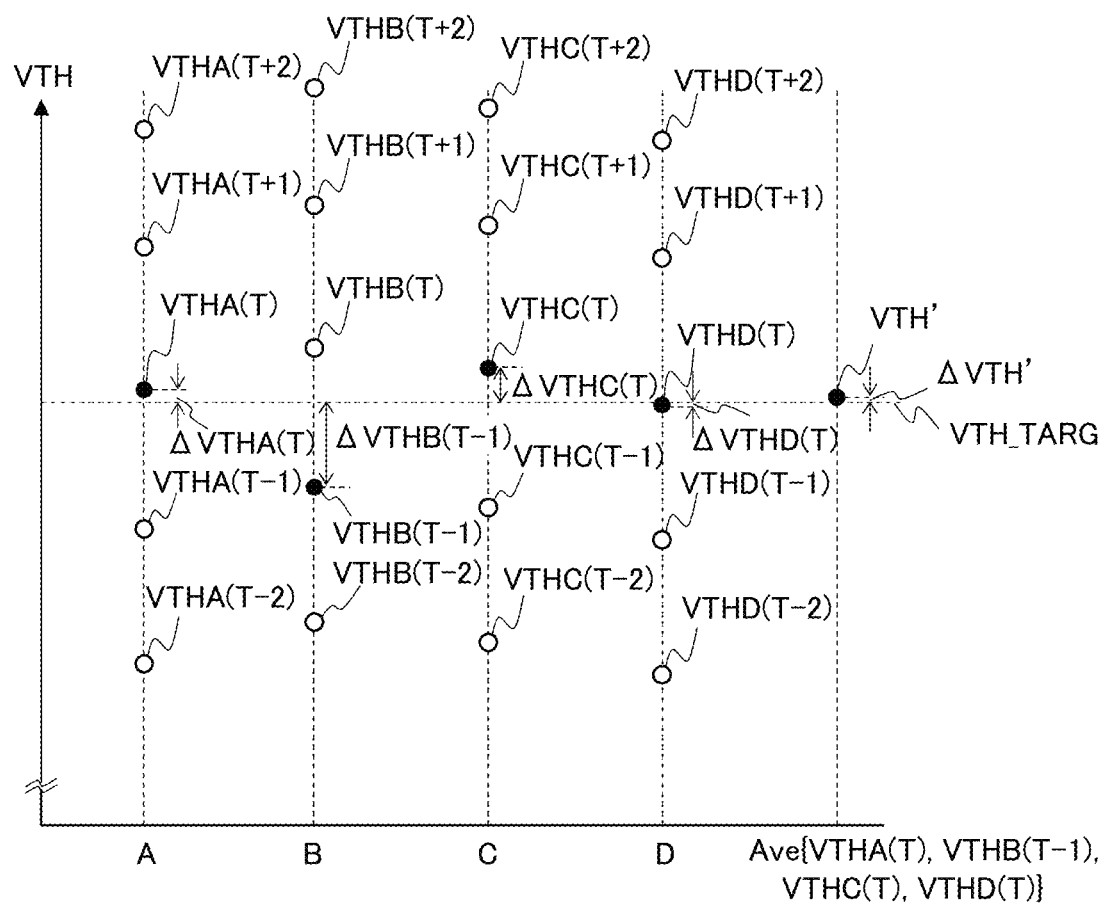
FIG. 3 is a diagram illustrating an example of how a threshold value is set according to a first embodiment of the present invention.

With reference to FIG. 3, an example of how the threshold value is set according to the first embodiment is described. As in the case of FIG. 2C, the vertical axis of FIG. 3 represents threshold values and the horizontal axis represents subpixels A, B, C and D and the pixel 301. In FIG. 3, as a threshold value of the subpixel B, the discrete value VTHB(T−1) is selected in lieu of VTHB(T) closest to the target value VTH_TARG, causing the pixel threshold value to change from VTH to VTH', which shows that it is closer to the target threshold value VTH_TARG. Stated another way, FIG. 3 illustrates that a difference between a pixel threshold value and a target threshold value can be reduced by selecting a discreate value other than a discrete value closest to the target threshold value for the threshold value of the subpixel.

Here, the difference between the target threshold value and a threshold value of each subpixel is half the interval between discrete values, i.e., half an increment between discrete values. Therefore, the total of the differences made in the four subpixels is equivalent to two increments of the discrete values (=0.5 increments×4) at a maximum. Accordingly, in each of the four subpixels, the threshold value is changed over two increments of the discrete values on both the positive and negative sides in order to search for a combination of threshold values which can set off the total of differences made in the four subpixels.

For reference, $5^4=625$ combinations are generated when the discreate values are changed over two increments on the positive and negative sides in each of the four subpixels. For example, even if 625 searches are executed in all the pixels of the detection element module 300 having 2000 pixels, $1.25 \times 10^6$ searches are required. This may be accomplished within less than one second by a standard arithmetic unit that is capable of performing floating-point operations $5 \times 10^9$ times a second.

Figure 4:
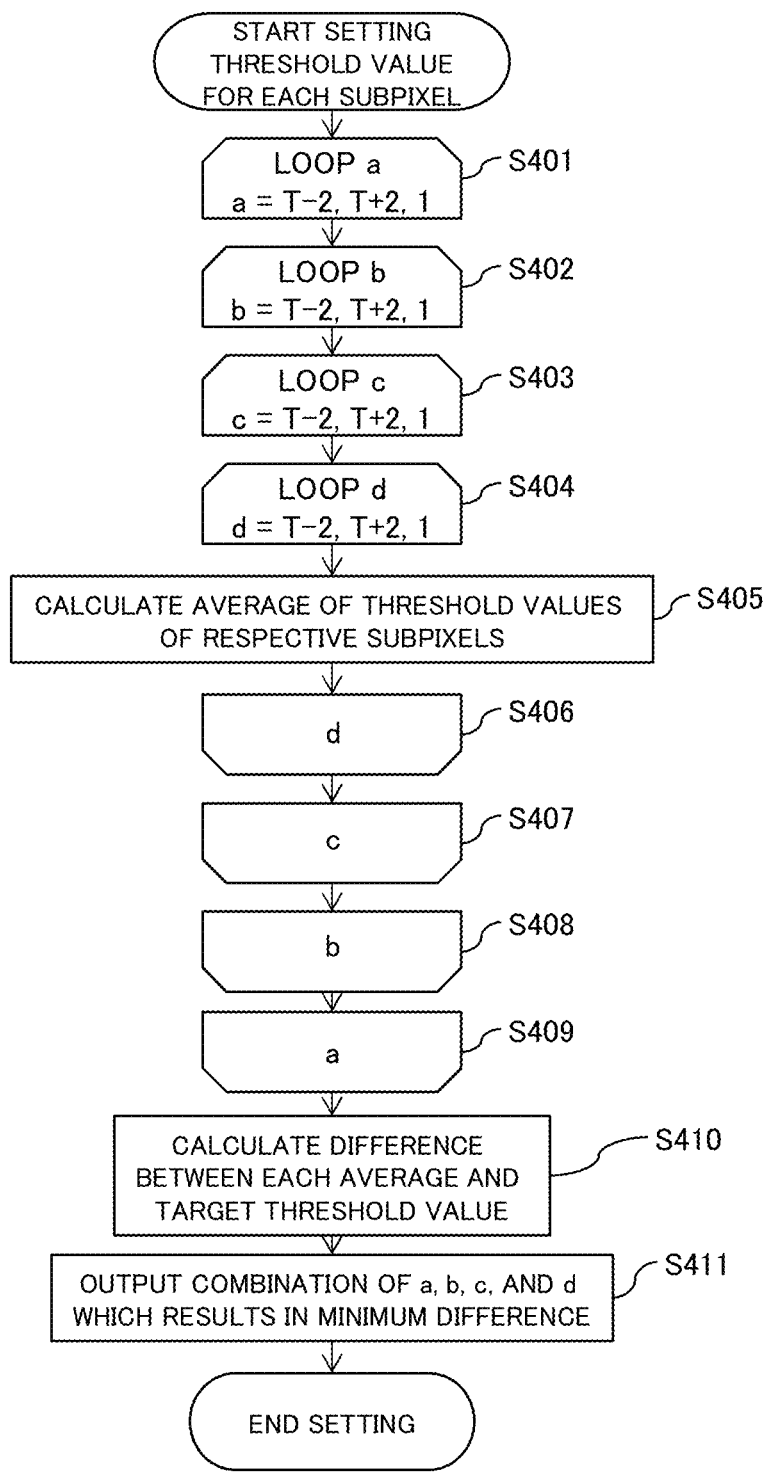
FIG. 4 is a flow diagram of example processing according to the first embodiment.

With reference to FIG. 4, an example flow of processing according to the first embodiment is described. For reference, the flow of processing illustrated in FIG. 4 is executed by the signal processing section 3 or a computer.
(S401 to S409)

As a threshold value of the subpixel A, the discrete values from VTHA(T−2) to VTHA(T+2) are iteratively changed on an increment-by-increment basis. It is noted that a discrete value closest to the target threshold value VTH_TARG is VTHA(T). The discrete values from VTHA(T−2) to VTHA(T+2) include the top five discrete values arranged in order of proximity to the target threshold value VTH_TARG. More specifically, for the threshold value VTHA in FIG. 3, first place is VTHA(T), second place is VTHA(T−1), third place is VTHA(T+1), fourth place is VTHA(T−2), and fifth place is VTHA(T+2). For threshold value VTHD in FIG. 3, since VTHD(T) is smaller than VTH_TARG, unlike the order in VTHA, first place is VTHD(T), second place is VTHD(T+1), third place is VTHD(T−1), fourth place is VTHD(T+2), and fifth place is VTHD(T−2).
(S402 to S408)

In a similar manner to S401 to S409, as a threshold value of the subpixel B, the discrete values from VTHB(T−2) to VTHB(T+2) are iteratively changed on an increment-by-increment basis.
(S403 to S407)

In a similar manner to S401 to S409, as a threshold value of the subpixel C, the discrete values from VTHC(T−2) to VTHC(T+2) are iteratively changed on an increment-by-increment basis.
(S404 to S406)

In a similar manner to S401 to S409, as a threshold value of the subpixel D, the discrete values from VTHD(T−2) to VTHD(T+2) are iteratively changed on an increment-by-increment basis.
(S405)

An average of the threshold values of the individual subpixels is calculated. Specifically, 625 averages are calculated by repeating the multiple loops of S401 to S409, S402 to S408, S403 to 407, and S404 to S406.
(S410)

Differences between the 625 averages and the target threshold value are calculated.
(S411)

A combination of threshold values of the individual subpixels which result in a minimum of the differences calculated in S410 is output.

Figure 5:
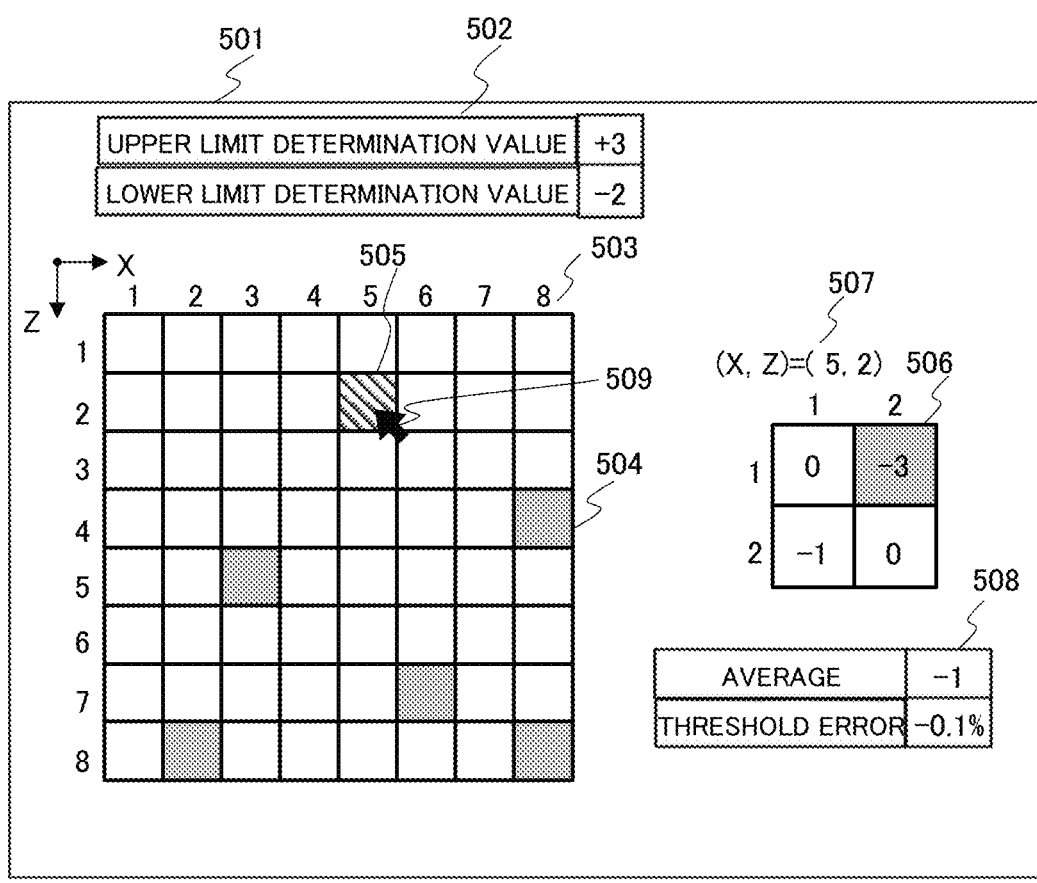
FIG. 5 is a diagram of an example display window according to the first embodiment.

With reference to FIG. 5, an example display window for outputting a combination of threshold values of the individual subpixels is described. The display window 501 illustrated in FIG. 5 by way of example has a threshold range input portion 502, a pixel map 503, a subpixel map 506, a coordinate display portion 507, and a threshold data display portion 508.

In the threshold range input portion 502, an upper limit determination value and a lower limit determination value are input as an allowable range of threshold values of a pixel and subpixels. In the example in FIG. 5, +3 is input as an upper limit determination value and −2 is input as a lower limit determination value. In the pixel map 503, an array of pixels making up the detection element module 300 is displayed. In the example illustrated in FIG. 5, eight pixels are arranged in the X direction and eight pixels are arranged in the Z direction. In the pixel map 503, out-of-range pixels 504 of which the threshold values are out of the allowable range are highlighted.

In the subpixel map 506, a selected pixel 505 which is a pixel selected by a cursor 509 is displayed in detail.

It is noted that coordinates of the selected pixel 505 are displayed in the coordinate display portion 507. In the subpixel map 506, an array of subpixels making up the selected pixel 505 is displayed, and an example illustrated in FIG. 5 is a 2-by-2 subpixel array. In the subpixel map 506, a subpixel of which a threshold value is out of the allowable range is highlighted in a similar manner to the pixel map 503.

In the threshold data display portion 508, an average of threshold values of the individual subpixels and a threshold error which is a difference between the average and the target threshold value are displayed as threshold data of the subpixel displayed in the subpixel map 506. It will be apparent that the subpixel map 506 and the threshold data display portion 508 may be configured to provide displays for two or more pixels, without being limited to for one pixel.

With the display window 501 illustrated in FIG. 5, a threshold state is displayed in two stages, the pixel map 503 and the subpixel map 506. This enables the operator to know exhaustively, from the pixel map 503, a location of a pixel of which the threshold value is out of the allowable range, and also to check, in the subpixel map 506, details of the threshold state of the subpixels. It will be apparent that the subpixel map 506 may have the function of receiving a change of the threshold value of a subpixel. In this case, immediately after a threshold value of a subpixel is changed, the threshold data displayed in the threshold data display portion 508 is updated. Having such a function enables the operator to make fine adjustments to a threshold value for each subpixel.

By the flow of processing illustrated in FIG. 4, a combination of threshold values of the individual subpixels is output so as to minimize a difference between the pixel threshold value, which is an average of the threshold values of the individual subpixels, and the target threshold value. Further, since a combination of the threshold values of the individual subpixels to be output is selected from among top five discrete values arranged in order of proximity to the target threshold value for each subpixel, searching for the combination requires no long time.

Figure 6:
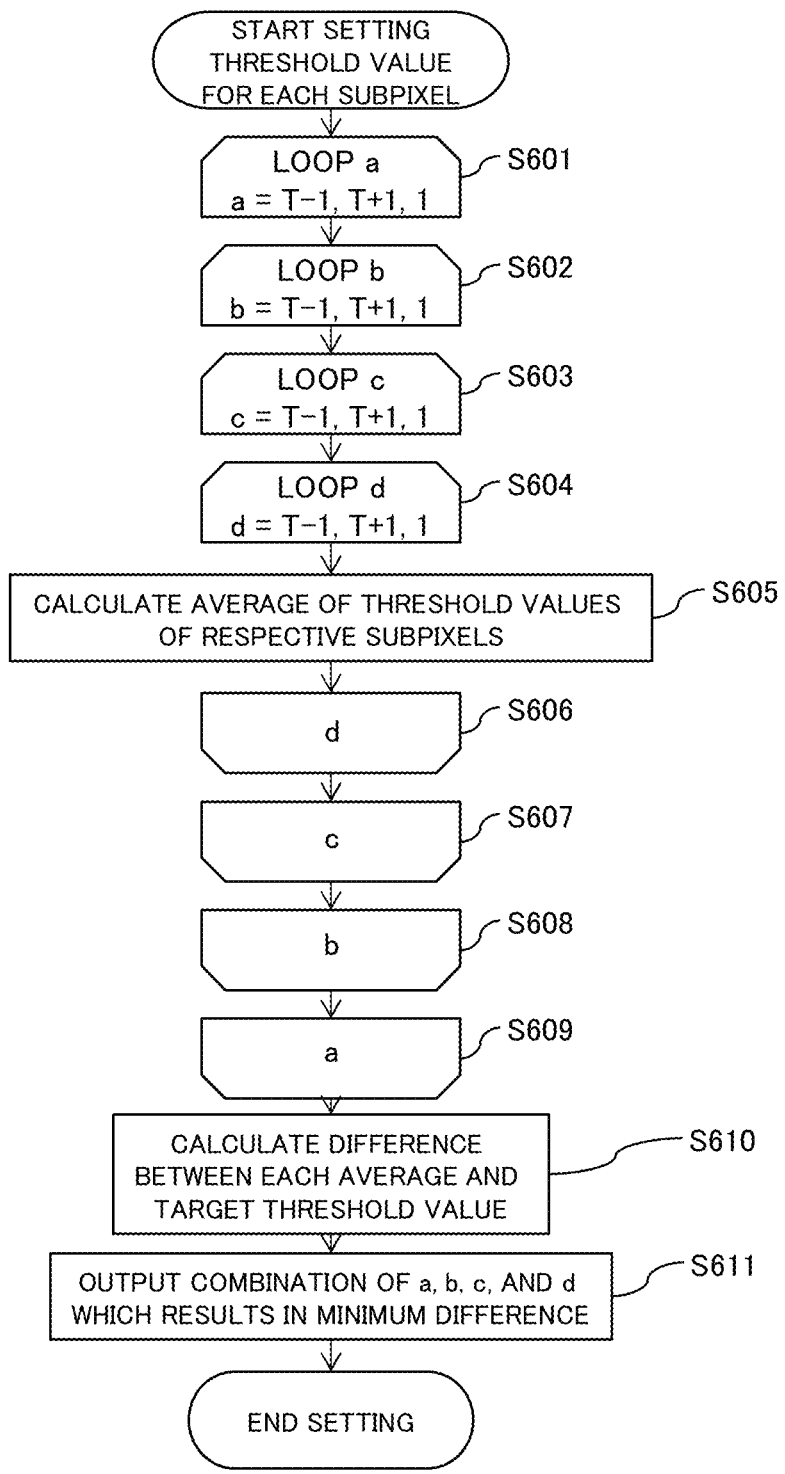
FIG. 6 is a flow diagram of another example processing according to the first embodiment.

With reference to FIG. 6, another example flow of processing according to the first embodiment is described. Since uniformity of the threshold values of the individual subpixels is preferably maintained, the description in FIG. 5 is given of the case where the discrete values for each of the four subpixels are changed by one increment on the positive and negative sides. For reference, the illustrated flow of processing in FIG. 6 is executed by the signal processing section 3 or a computer.

(S601 to S609)

As a threshold value for the subpixel A, the discrete values from VTHA(T−1) to VTHA(T+1) are iteratively changed on an increment-by-increment basis. It is noted that a discrete value closest to the target threshold value VTH_TARG is VTHA(T). The discrete values from VTHA(T−1) to VTHA(T+1) include the top two discrete values arranged in order of proximity to the target threshold value VTH_TARG, and a maximum increment difference is limited to 1.5 increments.

(S602 to S608)

In a similar manner to S601 to S609, as a threshold value for the subpixel B, the discrete values from VTHB(T−1) to VTHB(T+1) are iteratively changed on an increment-by-increment basis.

(S603 to S607)

In a similar manner to S601 to S609, as a threshold value for the subpixel C, the discrete values from VTHC(T−1) to VTHC(T+1) are iteratively changed on an increment-by-increment basis.

(S604 to S606)

In a similar manner to S601 to S609, as a threshold value for the subpixel D, the discrete values from VTHD(T−1) to VTHD(T+1) are iteratively changed on an increment-by-increment basis.

(S605)

An average of the threshold values of the individual subpixels is calculated. Specifically, $3^4=81$ averages are calculated by repeating the multiple loops of S601 to S609, S602 to S608, S603 to S607, and S604 to S606.

(S610)

Differences between the 81 averages and the target threshold value are calculated.

(S611)

A combination of threshold values of the individual subpixels which results in a minimum of the differences calculated in S610 is output.

By the flow of processing illustrated in FIG. 6, in the range in which an increment difference between threshold values is limited to 1.5 increments in each subpixel, a combination of threshold values of the individual subpixels is output so as to minimize a difference between the pixel threshold value, which is an average of the threshold values of the individual subpixels, the target threshold value. Further, since a combination of the threshold values of the individual subpixels to be output is selected from among top two discrete values arranged in order of proximity to the target threshold value for each subpixel, the combination can be searched in a shorter time than the flow shown in FIG. 4.

In FIG. 6, the range for searching for threshold values may be further narrowed. For example, in FIGS. 2A-2C, the threshold values of the four subpixels may be selected from among the discrete values VTHA(T), VTHB(T), VTHC(T), and VTHD(T) that are the closest to the target threshold value VTH_TARG, and the discrete values VTHA(T−1), VTHB(T−1), VTHC(T−1), and VTHD(T+1) that are the second closest to the target threshold value VTH_TARG. By selecting the threshold values of the subpixels in this manner, the number of combinations may be minimized to "2^the number of subpixels", thus improving the threshold value uniformity in a pixel.

Second Embodiment

In the first embodiment, the case where a pixel in the detection element module 300 is divided into 2-by-2 subpixels has been described. The division number of a pixel is not limited to 2 by 2. Therefore, in a second embodiment, a pixel that is divided into 3-by-3 subpixels will be described. It is noted that like reference signs are used to indicate similar configurations and functions to those in the first embodiment and a description is omitted.

Figure 7A:
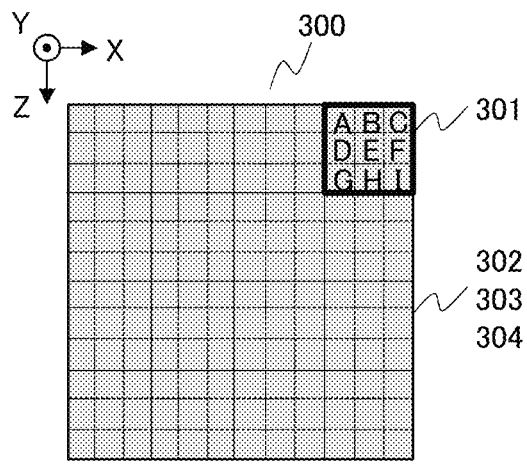
FIGS. 7A and 7B are diagrams illustrating an example of how a threshold value is set according to a second embodiment of the present invention.
Figure 7B:
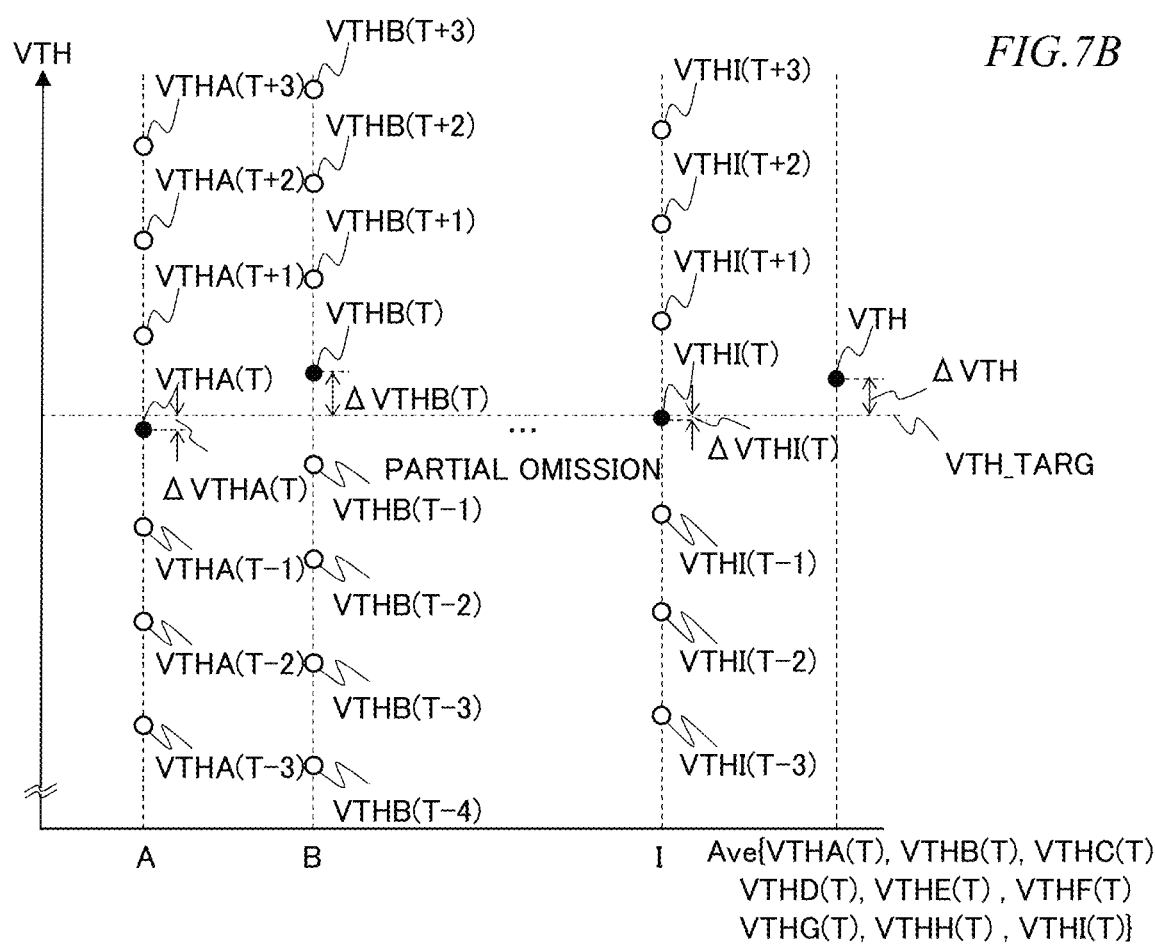

With reference to FIGS. 7A and 7B, the configuration of the detection element module 300 and an example of how a threshold value is set according to the second embodiment are described. FIG. 7A is a front view of the detection element module 300 while FIG. 7B is a diagram illustrating how a threshold is set for a pixel.

The detection element module 300 illustrated in FIG. 7A has four pixels arranged in the X direction and four pixels arranged in the Z axis, and a pixel 301 is divided into 3-by-3 subpixels A, B, . . . , and I in order to improve the count performance. The subpixels A, B, . . . , and I are identical in size and are connected respectively via the pixel electrodes 306 to the photon counting circuit 304.

With reference to FIG. 7B, an example of how a threshold value is set according to the second embodiment is described. As in the case of FIG. 2C, the vertical axis of FIG. 7B represents threshold values and the horizontal axis represents subpixels A, B, . . . , and I and the pixel 301. As in the case of the first embodiment, one of a plurality of discrete values is selected as a threshold value of each of the subpixels A, B, . . . , and I, and intervals between the discrete values for each subpixel are equal.

Even if a discrete value closest to the target threshold value is selected as a threshold value of each subpixel, an absolute value of a difference between the two is half the interval between discrete values for each subpixel at a maximum, i.e., half an increment between discrete values, as in the case of the first embodiment.

Therefore, the total of the differences made in the nine subpixels is equivalent to 4.5 increments of the discrete values (=0.5 increments×9) at a maximum. Accordingly, in the second embodiment, in each of the nine subpixels, the threshold value is changed over five increments of the discrete values on both the positive and negative sides in order to search for a combination which can set off the total of differences made in the nine subpixels.

For reference, $11^9 = 2.4 \times 10^9$ combinations are generated when the discrete values are changed over five increments on the positive and negative sides in each of the nine subpixels. For example, even if $2.4 \times 10^9$ searches are executed in all the pixels of the detection element module 300 having 2000 pixels, $4.7 \times 10^{12}$ searches are required. This may be accomplished in approximately 15 minutes by a standard arithmetic unit that is capable of performing floating-point operations $5 \times 10^9$ times a second.

Figure 8:
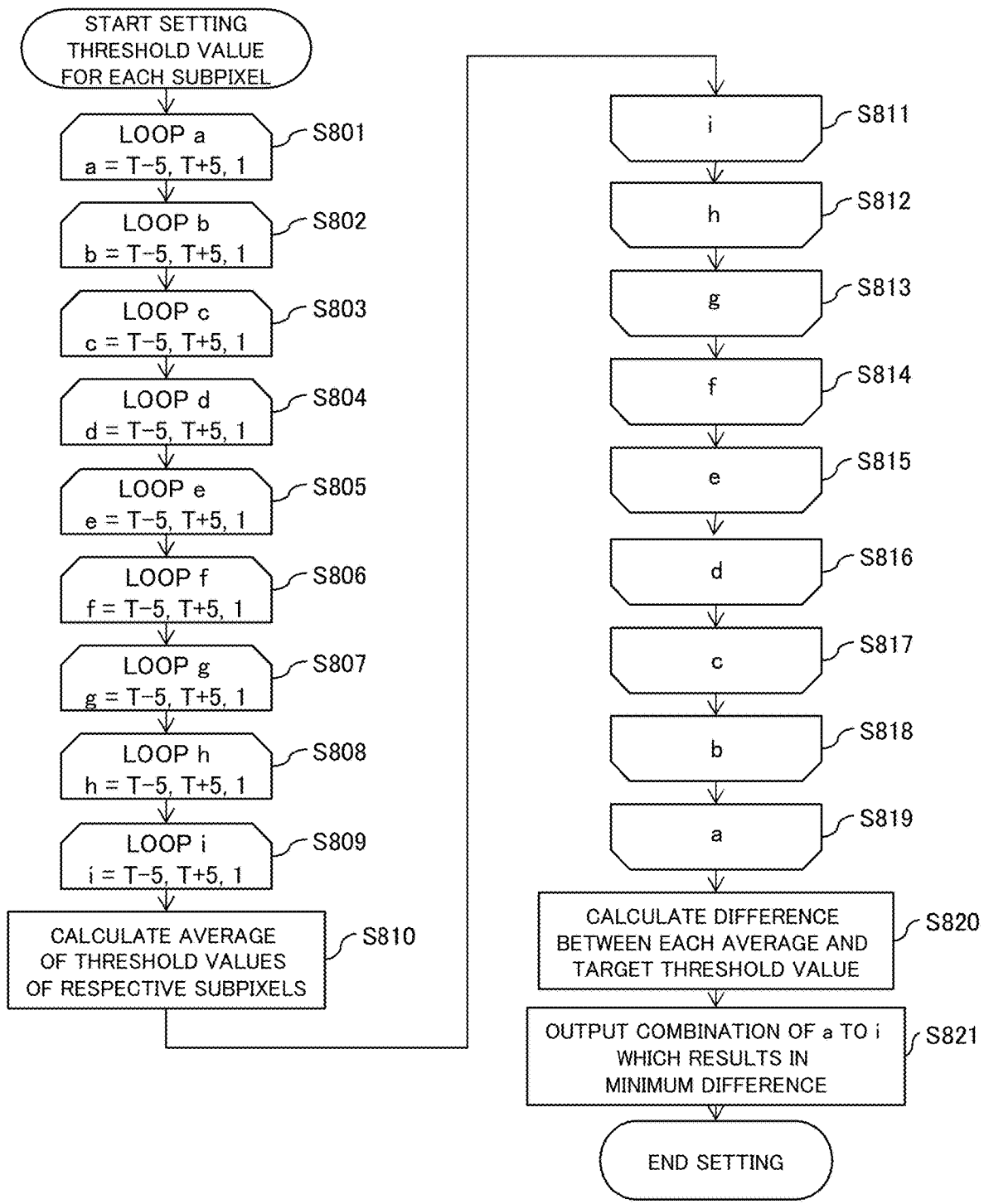
FIG. 8 is a flow diagram of example processing according to the second embodiment.

With reference to FIG. 8, an example flow of processing according to the second embodiment is described. For reference, the flow of processing illustrated in FIG. 8 is executed by the signal processing section 3 or a computer.
(S801 to S819)

As a threshold value for the subpixel A, the discrete values from VTHA(T−5) to VTHA(T+5) are iteratively changed on an increment-by-increment basis. It is noted that a discrete value closest to the target threshold value VTH_TARG is VTHA(T). The discrete values from VTHA(T−5) to VTHA(T+5) include the top 11 discrete values arranged in order of proximity to the target threshold value VTH_TARG.
(S802 to 818) to (S809 to 811)

In a similar manner to S801 to S819, as a threshold value for each of the subpixels B, C, . . . , and I, the discrete values corresponding to from (T−5) to (T+5) are iteratively changed on an increment-by-increment basis.
(S810)

An average of the threshold values of the individual subpixels is calculated. Specifically, $2.4 \times 10^9$ averages are calculated by repeating the multiple loops from (S801 to S819) to (S809 to S811).
(S820)

Differences between the $2.4 \times 10^9$ averages and the target threshold value are calculated.
(S821)

A combination of threshold values of the individual subpixels which result in a minimum of the differences calculated in S820 is output.

By the flow of processing illustrated in FIG. 8, a combination of threshold values of the individual subpixels is output so as to minimize a difference between the target threshold value and the pixel threshold value which is an average of the threshold values of the individual subpixels.

Further, since a combination of threshold values of the individual subpixels to be output is selected from among the top 11 closest discrete values arranged in order of proximity to the target threshold value for each subpixel, searching for the combination requires no long time.

It will be apparent that the division number of a pixel is not limited to 2 by 2 or 3 by 3, and it may be 4 by 4 or larger, 2 by 3, 3 by 2, 1 by 2, and the like. Since an absolute value of a difference between the threshold value of each subpixel and the target threshold value is equivalent to 0.5 increments between discrete values for each subpixel at a maximum, the total of the differences when the number of subpixels is M is equivalent to 0.5×M increments. In order to set off the difference equivalent to 0.5×M increments, the threshold values of the represent subpixels may be changed over 0.5×M increments on both the positive and negative sides from a discrete value closest the target threshold value. Therefore, the number of iterations for each subpixel in the multiple loops is M+1. It is only required to search the top (M+1) discrete values arranged in order of proximity to the target threshold value, for a combination that results in a minimum difference between the pixel threshold value and the target threshold value.

Third Embodiment

In the second embodiment, the case where a pixel in the detection element module 300 is divided into 3-by-3 subpixels equal in size has been described. The subpixels are not limited to having the same size. Therefore, in a third embodiment, a pixel that is divided into different sized subpixels will be described. It is noted that like reference signs are used to indicate similar configurations and functions to those in the first and second embodiments and a description is omitted.

Figure 9A:
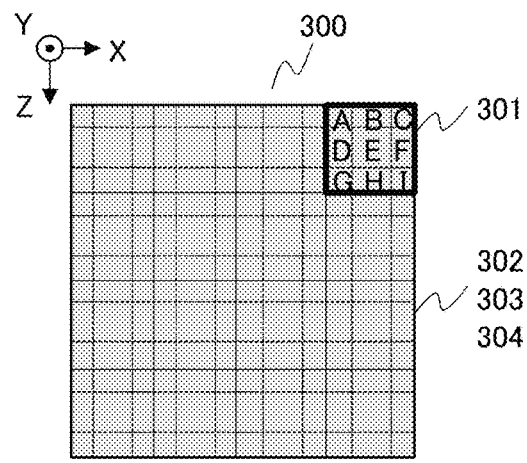
FIGS. 9A and 9B are diagrams illustrating an example of how a threshold value is set according to a third embodiment of the present invention.
Figure 9B:
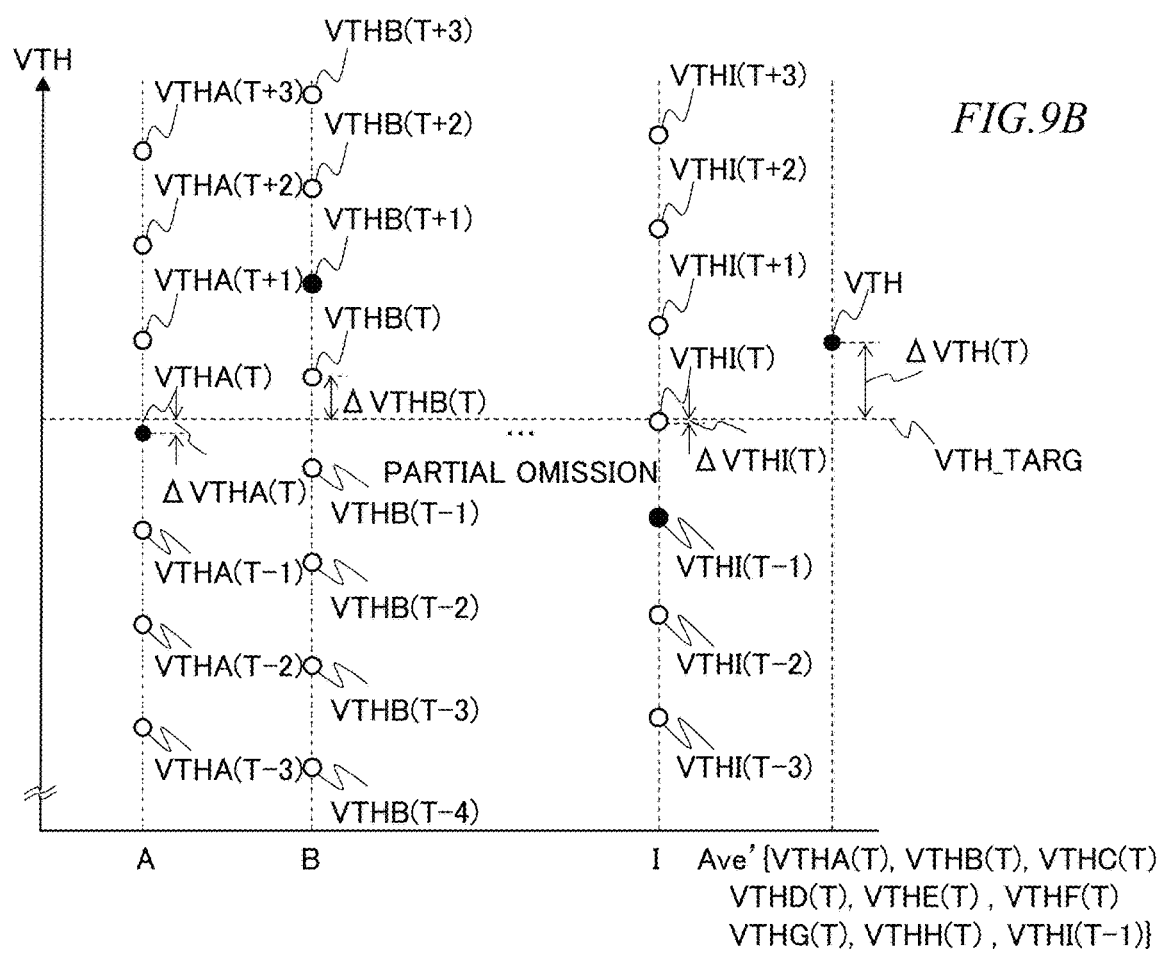

With reference to FIGS. 9A and 9B, the configuration of the detection element module 300 and an example of how a threshold value is set according to the third embodiment are described. FIG. 9A is a front view of the detection element module 300 while FIG. 9B is a diagram illustrating how a threshold is set for a pixel.

The detection element module 300 illustrated in FIG. 9A has four pixels arranged in the X direction and four pixels arranged in the Z axis, and a pixel 301 is divided into 3-by-3 subpixels A, B, . . . , and I in order to improve the count performance as in the case of the second embodiment. The subpixels A, B, . . . , and I are different in size and are connected respectively via the pixel electrodes 306 to the photon counting circuit 304.

With reference to FIG. 9B, an example of how a threshold value is set according to the third embodiment is described. As in the case of FIG. 2C, the vertical axis of FIG. 9B represents threshold values and the horizontal axis represents subpixels A, B, . . . , and I and the pixel 301. As in the case of the first embodiment, one of a plurality of discrete values is selected as a threshold value for each of the subpixels A, B, . . . , and I, and intervals between the discrete values for each subpixel are equal. It is noted that the threshold value of the pixel 301 made up of the nine subpixels is a weighted average of the threshold values of the individual subpixels, which is obtained by using an area ratio for each subpixel as a weight coefficient.

Even if a discrete value closest to the target threshold value is selected as a threshold value for each subpixel, an absolute value of a difference between the two is half an increment between discrete values for each subpixel at a maximum. Therefore, the total of the differences made in the nine subpixels is equivalent to 4.5 increments of the discrete values at a maximum, as in the case of the second embodiment. Accordingly, in the third embodiment, in each of the nine subpixels, the threshold value is changed over five increments of the discrete values on both the positive and negative sides in order to search for a combination which can set off the total of differences made in the nine subpixels.

Figure 10:
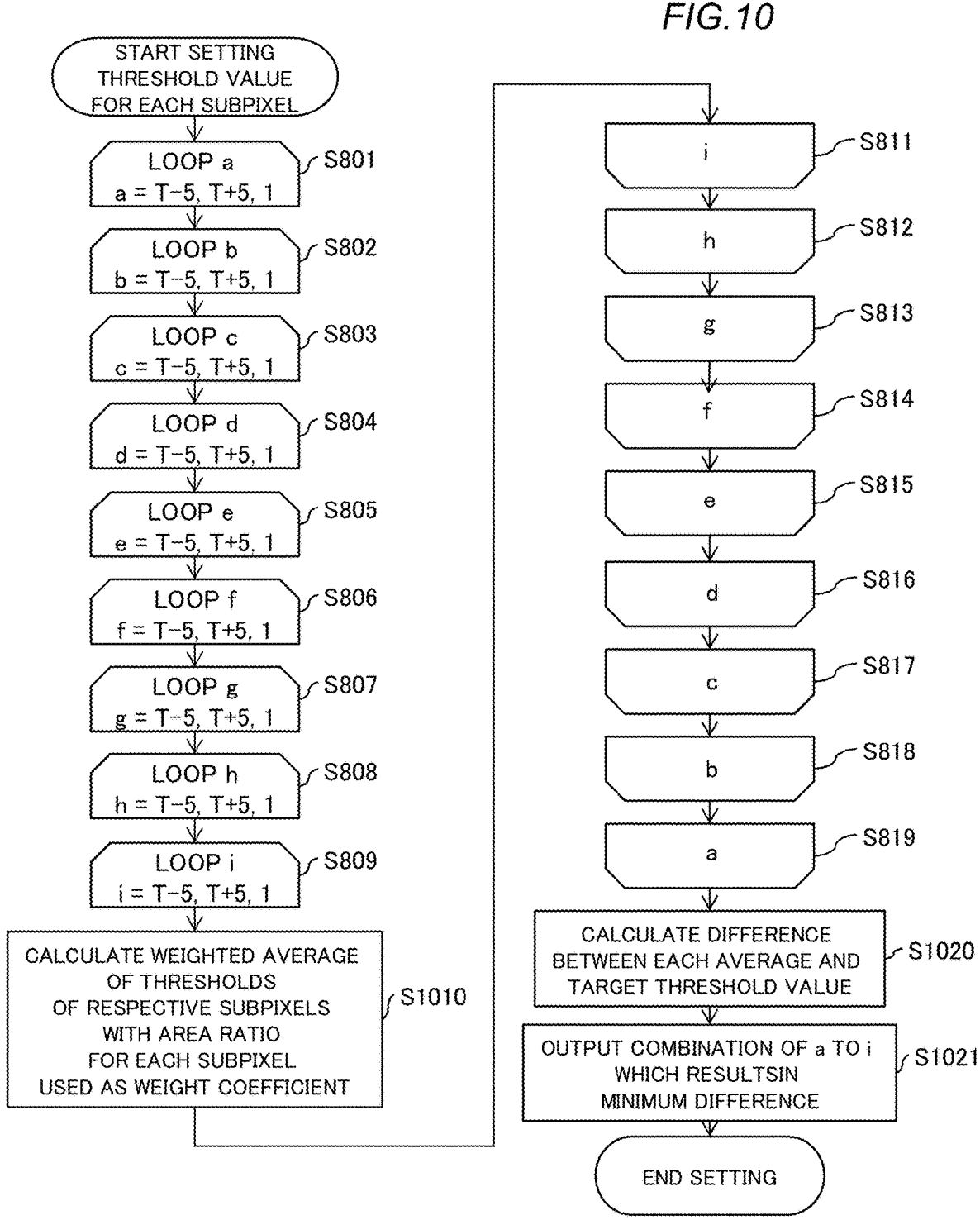
FIG. 10 is a flow diagram of example processing according to the third embodiment.

With reference to FIG. 10, an example flow of processing according to the third embodiment is described.

For reference, the flow of processing illustrated in FIG. 10 is executed by the signal processing section 3 or a computer. (S801 to 819) to (S809 to 811)

The steps are similar to those in the second embodiment, and a description is omitted.

(S1010)

A weighted average of the threshold values of the individual subpixels is calculated with an area ratio for each subpixel used as a weight coefficient. Specifically, $2.4 \times 10^9$ weighted averages are calculated by repeating the multiple loops from (S801 to 819) to (S809 to 811).

(S1020)

Differences between the target threshold value and the $2.4 \times 10^9$ weighted averages are calculated.

(S1021)

A combination of threshold values of the individual subpixels which results in a minimum of the differences calculated in S1020 is output.

By the flow of processing illustrated in FIG. 10, a combination of threshold values of the individual subpixels is output so as to minimize a difference between the target threshold value and the pixel threshold value which is a weighted average of the threshold values of the individual subpixels. Further, since a combination of threshold values of the individual subpixels to be output is selected from among the top 11 closest discrete values arranged in order of proximity to the target threshold value in each subpixel, searching for the combination requires no long time. It should be noted that, in S1010, if all area ratios of the subpixels are 1.0, the weighted average of the threshold values of the individual subpixels becomes a simple average, and FIG. 10 is equivalent to FIG. 8.

Fourth Embodiment

In the first to third embodiments, the case where the number of X-ray photons is the same independent of energy has been described. In a fourth embodiment, the case where the number of X-ray phones varies depending on energy will be described. It is noted that like reference signs are used to indicate similar configurations and functions to those in the first to third embodiments and a description is omitted.

Figure 11:
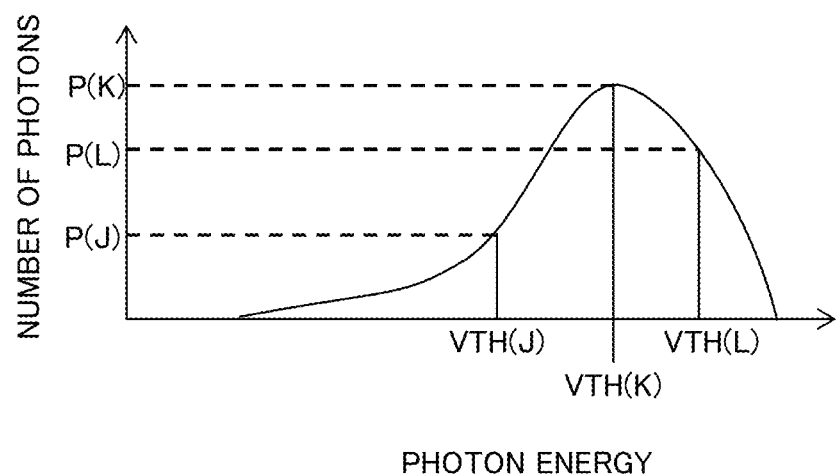
FIG. 11 is a chart illustrating an example of how a threshold value is set according to a fourth embodiment of the present invention.

With reference to FIG. 11, an example of an X-ray photon energy spectrum is described. In FIG. 11, the vertical axis represents X-ray photon energy and the horizontal axis represents the number of photons in each energy level. As illustrated in FIG. 11, the number of X-ray photons varies depending on energy. When energy is VTH(J), VTH(K), VTH(L), the numbers of photons are P(J), P(K), P(L), respectively. Therefore, for changing the threshold value corresponding to energy, by performing a correction using the number of photons in the energy the threshold setting with higher precision is enabled. For this purpose, in the fourth embodiment, a weighted average of the threshold values of the individual subpixels is obtained by using a photon number ratio at each energy level as a weight coefficient to be calculated as a pixel threshold value. It will be understood that a photon number ratio at each energy level used as the weight coefficient may be pre-acquired by simulations or calibrations or may be calculated from a scanogram image acquired by preliminary imaging.

Figure 12:
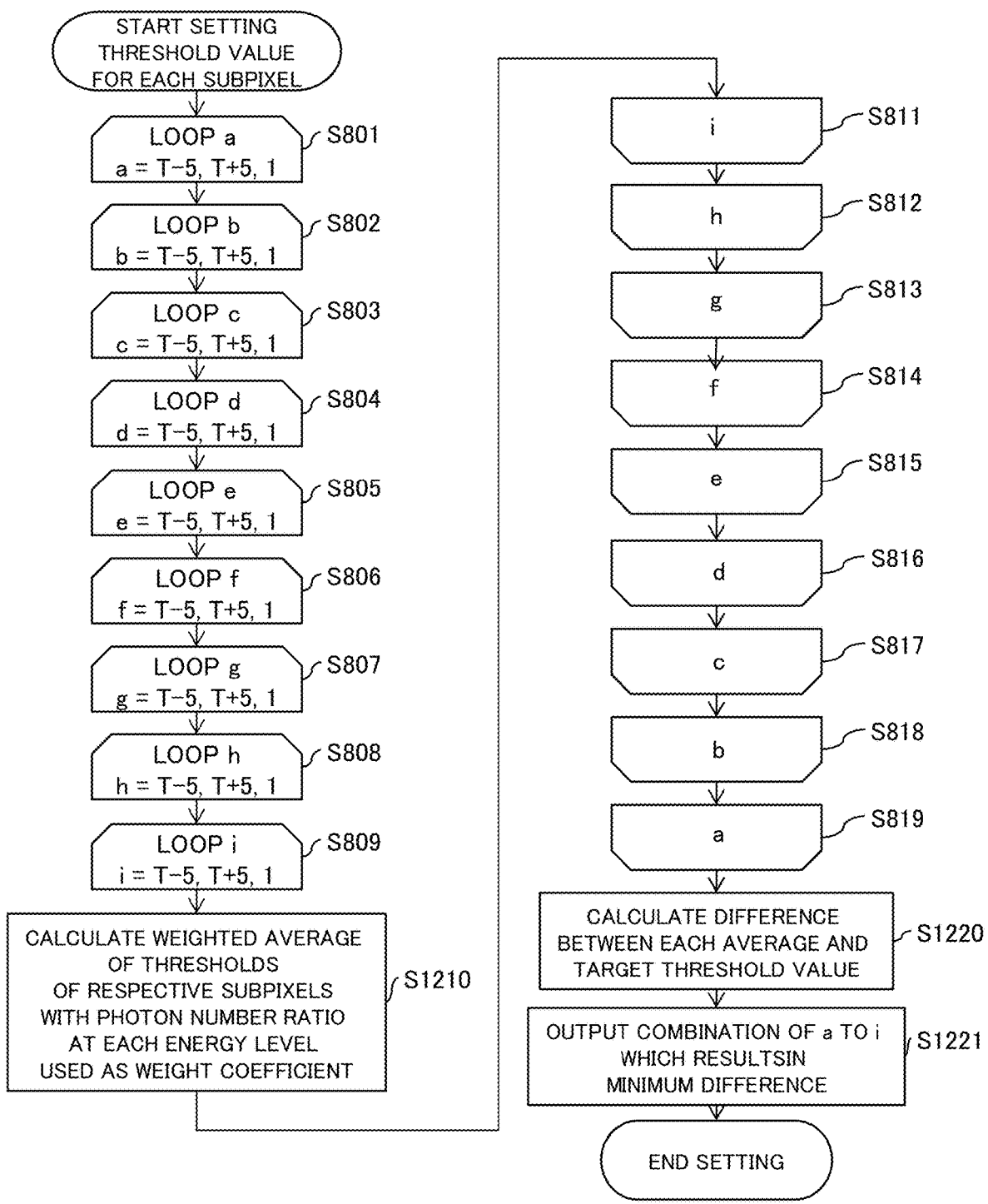
FIG. 12 is a flow diagram of example processing according to the fourth embodiment.

With reference to FIG. 12, an example flow of processing according to the fourth embodiment is described. For reference, the flow of processing illustrated in FIG. 12 is executed by the signal processing section 3 or a computer. (S801 to 819) to (S809 to 811)

The steps are similar to those in the second embodiment, and a description is omitted.

(S1210)

A weighted average of the threshold values for the individual subpixels is calculated with a photon number ratio at each energy level used as a weight coefficient. Specifically, $2.4 \times 10^9$ weighted averages are calculated by repeating the multiple loops from (S801 to 819) to (S809 to 811).

(S1220)

Differences between the target threshold value and the $2.4 \times 10^9$ weighted averages are calculated.

(S1221)

A combination of threshold values of the individual subpixels which results in a minimum of the differences calculated in S1220 is output.

By the flow of processing illustrated in FIG. 12, a combination of threshold values of the individual subpixels is output so as to minimize a difference between the target threshold value and the pixel threshold value which is a weighted average of the threshold values of the individual subpixels. Further, since a combination of threshold values of the individual subpixels to be output is selected from among the top 11 closest discrete values arranged in order of proximity to the target threshold value in each subpixel, searching for the combination requires no long time. It should be noted that, in S1210, if all photon number ratios at each energy level are 1.0, the weighted average of the threshold values for the individual subpixels becomes a simple average, and FIG. 12 is equivalent to FIG. 8.

Fifth Embodiment

In the second embodiment, the case where the threshold value is changed for each of the 3 by 3 subpixels has been described. In a fifth embodiment, a description will be given of a process which involves dividing 3 by 3 subpixels into a plurality of groups and changing the threshold value for each group in order to reduce the number of multiple loops. It is noted that like reference signs are used to indicate similar configurations and functions to those in the second embodiment and a description is omitted.

With reference to FIGS. 13A, 13B, and 13C, the configuration of the detection element module 300, the grouping of the subpixels, and an example of how a threshold value is set according to the fifth embodiment are described. FIG. 13A is a front view of the detection element module 300, FIG. 13B is an enlarged view of the pixel 301, and 13C is a diagram illustrating how a threshold is set for a pixel.

The detection element module 300 illustrated in FIG. 13A has four pixels arranged in the X direction and four pixels arranged in the Z axis, and a pixel 301 is divided into 3-by-3 subpixels A, B, . . . , and I in order to improve the count performance as in the case of the second embodiment. The subpixels A, B, . . . , and I are identical in size and are connected respectively via the pixel electrodes 306 to the photon counting circuit 304.

The subpixels A, B, . . . , I making up the pixel 301 is divided into a plurality of groups according to position within the pixel 301. Specifically, as illustrated in FIG. 13B, the subpixels are divided into three groups of subpixels A, C, G and I which are located at corners of the pixel 301, subpixels B, D, F and H which are located on edges of the pixel 301, and subpixel E located except for the corners and edges of the pixel 301. The subpixel E located except for the corners and edges is also a subpixel located at the center of the pixel 301. Since the subpixels sorted into the same group according to position within the pixel 301 are located at the same distance from the center of the pixel 301, by changing the threshold value for each group, variations in the threshold setting due to the incident direction and incident position of the X-ray photons may be minimized.

With reference to FIG. 13C, an example of how a threshold value is set according to the fifth embodiment is described. As in the case of FIG. 2C, the vertical axis of FIG. 13C represents threshold values and the horizontal axis represents subpixels A, B, . . . , and I and the pixel 301. As in the case of the first embodiment, one of a plurality of discrete values is selected as a threshold value for each of the subpixels A, B, . . . , and I, and intervals between discrete values for each subpixel are equal.

Even if a discrete value closest to the target threshold value is selected as a threshold value for each subpixel, an absolute value of a difference between the two is half an increment between discrete values for each subpixel at a maximum. Therefore, the total of the differences made in the nine subpixels is equivalent to 4.5 increments of the discrete values at a maximum, as in the case of the second embodiment. Accordingly, in the fifth embodiment, in each of the nine subpixels, the threshold value is changed over five increments of the discrete values on both the positive and negative sides in order to search for a combination which can set off total of differences made in the nine subpixels.

In the fifth embodiment, the number of multiple loops is reduced by changing the threshold value for each group, instead of changing the threshold value for each subpixel. $11^3=1331$ combinations are generated when the discrete values are changed over five increments on the positive and negative sides in each of the three groups. Therefore, the number of multiple loops may be further reduced as compared with the $2.4 \times 10^9$ combinations generated when the discrete values are changed in each of the subpixels.

Figure 14:
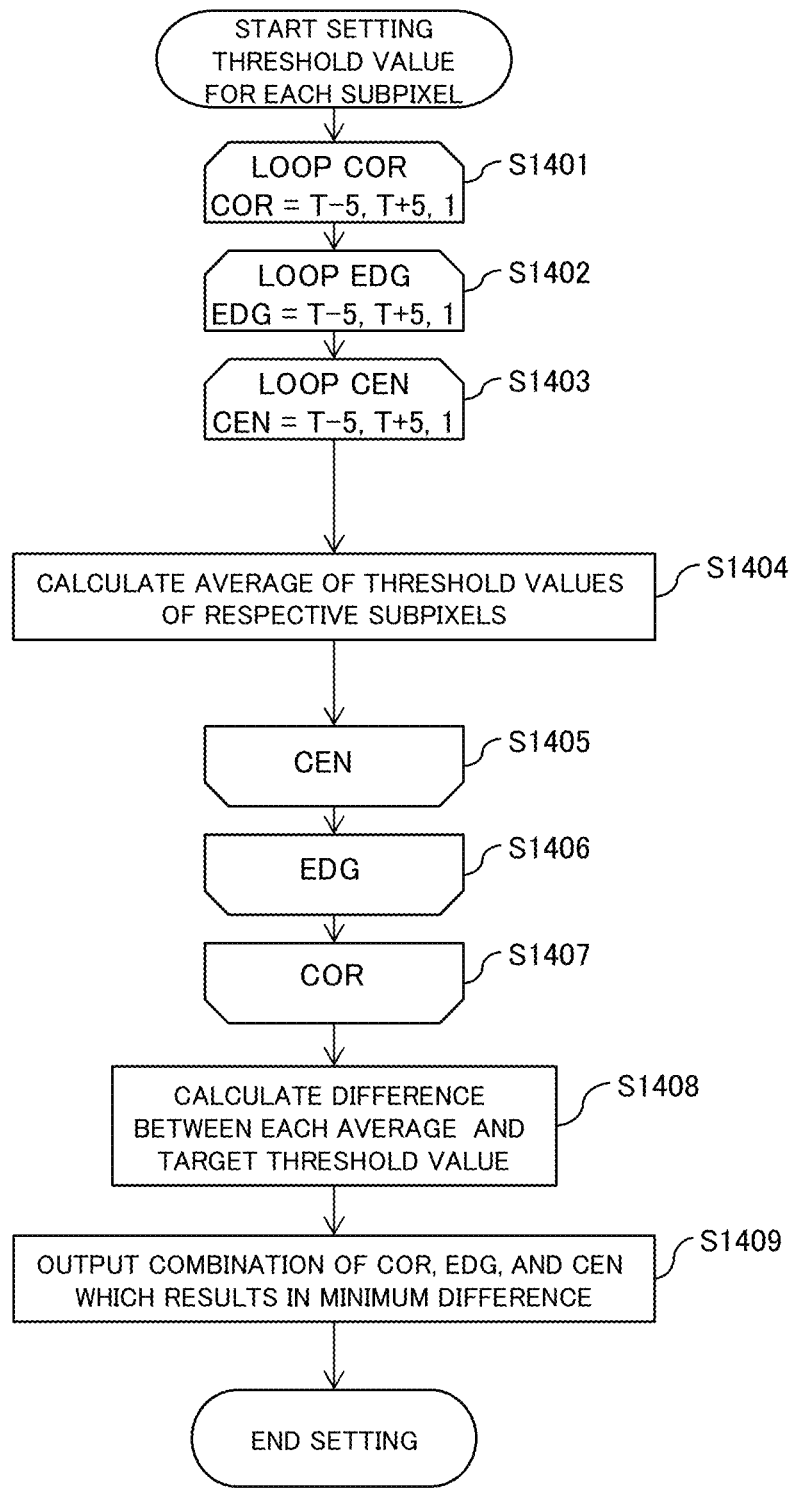
FIG. 14 is a flow diagram of example processing according to the fifth embodiment.

With reference to FIG. 14, an example flow of processing according to the fifth embodiment is described. It is noted that the flow of processing illustrated in FIG. 14 is executed by the signal processing section 3 or a computer.

(S1401 to S1407)

As a threshold value of the subpixels located at the corners of the pixel 301, the discrete values from (T−5) to (T+5) are iteratively changed on an increment-by-increment basis. A discrete value closest to the target threshold value VTH_TARG is (T). The discrete values from (T−5) to (T+5) include the top 11 discrete values arranged in order of proximity to the target threshold value VTH_TARG.

(S1402 to S1406)

In a similar manner to S1401 to S1407, as a threshold value of the subpixels located on the edges of the pixel 301, the discrete values from (T−5) to (T+5) are iteratively changed on an increment-by-increment basis.

(S1403 to S1405)

In a similar manner to S1401 to S1407, as a threshold value of the subpixel located at the center of the pixel 301, the discrete values from (T−5) to (T+5) are iteratively changed on an increment-by-increment basis.

(S1404)

An average of the threshold values of the respective groups is calculated. Specifically, 1331 averages are calculated by repeating the multiple loops from (S1401 to S1407) to (S1403 to S1405).

(S1408) Differences between the 1331 averages and the target threshold value are calculated.

(S1409)

A combination of threshold values of the respective groups which results in a minimum of the differences calculated in S1408 is output.

By the flow of processing illustrated in FIG. 14, a combination of the threshold values of the respective groups is output so as to minimize a difference between the target threshold value and the pixel threshold value which is an average of the threshold values of the respective groups. Further, since a combination of the threshold values for the respective groups to be output is selected from among the 1331 combinations, searching for it requires no long time.

Figures 15A, 15B:
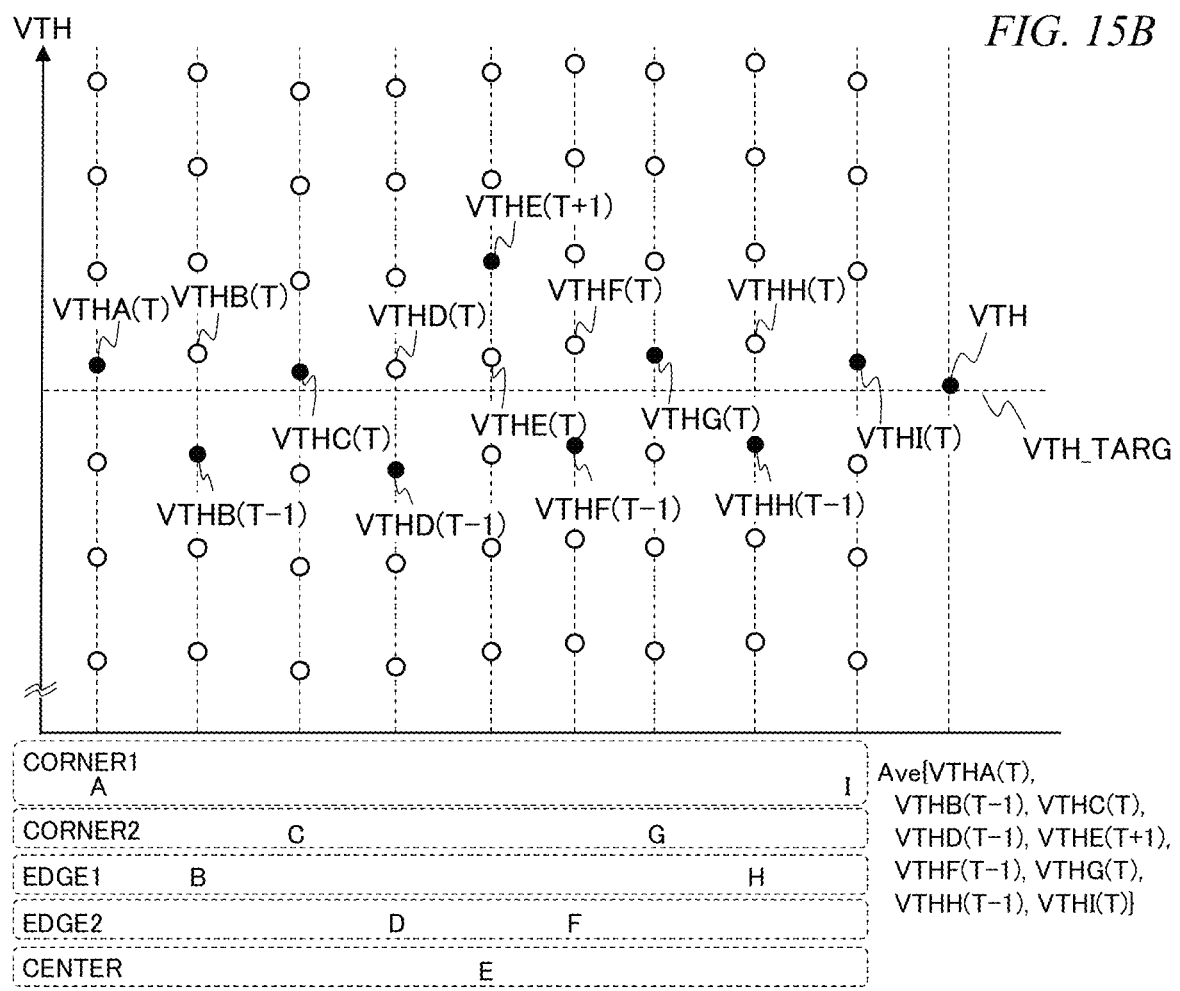
FIGS. 15A and 15B are diagrams illustrating another example of how a threshold value is set according to the fifth embodiment.

It will be apparent that the subpixels are not limited to be grouped into three groups as illustrated in FIGS. 13A, 13B, and 13C. Another grouping of the subpixels and an example of how a threshold value is set are described with reference to FIGS. 15A and 15B. FIG. 15A is an enlarged view of the pixel 301 and FIG. 15B is a diagram illustrating how a threshold is set for a pixel.

In FIG. 15A, the subpixels A, B, . . . , I making up the pixel 301 are divided into five groups according to position within the pixel 301. Specifically, the subpixels located at the corners of the pixel 301 are sorted into two groups of the diagonally opposite subpixels A and I and the diagonally opposite subpixels C and G; and the subpixels located on the edges of the pixel 301 are sorted into two groups of the opposite subpixels B and H and the opposite subpixels D and F. The subpixel E located at the center of the pixel 301 is grouped alone. By grouping the subpixels located at the corners of the pixel 301 into two groups and the subpixels located on the edges of the pixel 301 into another two groups, a further reduction in difference between the target threshold value and the pixel threshold value which is an average of the threshold values of the respective subpixels may be achieved.

With reference to FIG. 15B, an example of how a threshold value is set is described. As in the case of FIG. 2C, the vertical axis of FIG. 15B represents threshold values and the horizontal axis represents subpixels A, B, . . . , and I and the pixel 301. As in the case of the first embodiment, one of a plurality of discrete values is selected as a threshold value for each of the subpixels A, B, . . . , and I, and intervals between the discrete values for each subpixel are equal.

Even if a discrete value closest to the target threshold value is selected as a threshold value for each subpixel, an absolute value of a difference between the two is half an increment between discrete values for each subpixel at a maximum. Therefore, the total of the differences made in the nine subpixels is equivalent to 4.5 increments of the discrete values at a maximum, as in the case of the second embodiment. Accordingly, in FIG. 15B, in each of the nine subpixels, the threshold value is changed over five increments of the discrete values on both the positive and negative sides in order to search for a combination which can set off the total of differences made in the nine subpixels.

For reference, in FIG. 15B, the threshold is changed for each of the five groups, so that $11^5=1.6\times 10^5$ combinations are generated. Thus, the number of multiple loops may be greatly reduced as compared with the $2.4\times10^9$ combinations generated when the discrete values are changed in each of the subpixels.

Figure 16:
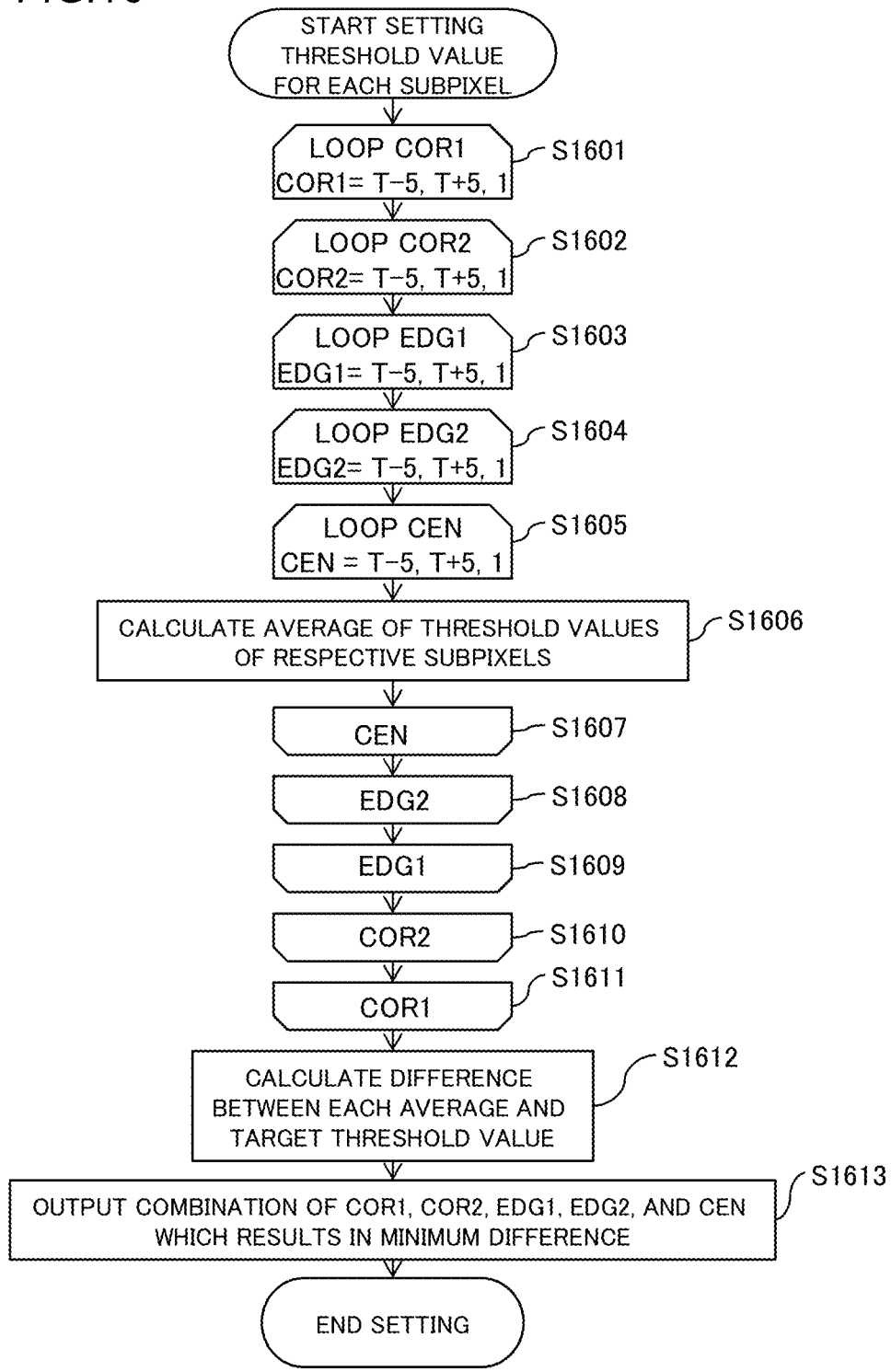
FIG. 16 is a flow diagram of another example processing according to the fifth embodiment.

With reference to FIG. 16, another example flow of processing according to the fifth embodiment is described. The flow of processing illustrated in FIG. 16 is executed by the signal processing section 3 or a computer.

(S1601 to S1611)

As a threshold value of one of the groups of the subpixels which are located at the corners of the pixel 301, the discrete values from (T−5) to (T+5) are iteratively changed on an increment-by-increment basis. A discrete value closest to the target threshold value VTH_TARG is (T). The discrete values from (T−5) to (T+5) include the top 11 discrete values arranged in order of proximity to the target threshold value VTH_TARG.

(S1602 to S1610)

In a similar manner to S1601 to S1611, as a threshold value of the other group of the subpixels which are located at the corners of the pixel 301, the discrete values from (T−5) to (T+5) are iteratively changed on an increment-by-increment basis.

(S1603 to S1609)

In a similar manner to S1601 to S1611, as a threshold value of one of the groups of the subpixels which are located on the edges of the pixel 301, the discrete values from (T−5) to (T+5) are iteratively changed on an increment-by-increment basis.

(S1604 to S1608)

In a similar manner to S1601 to S1611, as a threshold value of the other group of the subpixels which are located on the edges of the pixel 301, the discrete values from (T−5) to (T+5) are iteratively changed on an increment-by-increment basis.

(S1605 to S1607)

In a similar manner to S1601 to S1611, as a threshold value of the subpixel located at the center of the pixel 301, the discrete values from (T−5) to (T+5) are iteratively changed on an increment-by-increment basis.

(S1606)

An average of the threshold values of the respective groups is calculated. Specifically, $1.6\times10^5$ averages are calculated by repeating the multiple loops from (S1601 to S1611) to (S1605 to S1607).

(S1612)

Differences between the $1.6\times10^5$ averages and the target threshold value are calculated.

(S1613)

A combination of the threshold values of the respective groups which results in a minimum of the differences calculated in S1612 is output.

By the flow of processing illustrated in FIG. 16, a combination of the threshold values of the respective groups is output so as to minimize a difference between the target threshold value and the pixel threshold value which is an average of the threshold values of the respective groups. Further, since a combination of the threshold values of the respective groups to be output is selected from among the $1.6\times10^5$ combinations, searching for the combination requires no long time.

A plurality of embodiments of radiographic imaging apparatus according to the present invention have been described. The radiographic imaging apparatus according to the present invention is not limited to the above embodiments, and may be embodied by modifying components thereof without departing from the spirit or scope of the present invention. Further, a plurality of components disclosed in the above embodiments may be combined as appropriate. Further, several components of all the components described in the above embodiments may be omitted.

REFERENCE SIGNS LIST

1 . . . X-ray source
2 . . . X-ray detector
3 . . . signal processing section
4 . . . image generation section
5 . . . rotating plate
6 . . . Bed
7 . . . object
300 . . . detection element module
301 . . . pixel
302 . . . high voltage wiring
303 . . . semiconductor layer
304 . . . photon counting circuit
306 . . . pixel electrode
501 . . . display window
502 . . . threshold range input portion
503 . . . pixel map
504 . . . out-of-range pixel
505 . . . selected pixel
506 . . . subpixel map
507 . . . coordinate display portion
508 . . . threshold data display portion
509 . . . cursor

What is claimed is:

1. A photon counting circuit for counting, for each pixel, electrical charges generated depending on photon energy of radiation applied to an object,
wherein a pixel is divided into a plurality of subpixels, and
when N is a natural number, a threshold value of each of the subpixels is selected from among top N discrete values of a plurality of discrete values arranged in order of proximity to a target threshold value corresponding to the photon energy so as to minimize a difference between the target threshold value and an average of the threshold values of the respective subpixels included in the pixel.

2. The photon counting circuit according to claim 1, wherein when the number of subpixels included in the pixel is 2×2, N=5.

3. The photon counting circuit according to claim 1, wherein when the number of subpixels included in the pixel is 3×3, N=11.

4. The photon counting circuit according to claim 1, wherein N=3.

5. The photon counting circuit according to claim 1, wherein N=2.

6. The photon counting circuit according to claim 1, wherein when the number of subpixels included in the pixel is M, N=M+1.

7. The photon counting circuit according to claim 1, wherein the average is calculated as a weighted average of the threshold values of the respective subpixels, the weighted average being obtained by using an area ratio for each subpixel as a weight coefficient.

8. The photon counting circuit according to claim 1, wherein the average is calculated as a weighted average of the threshold values of the respective subpixels, the weighted average being obtained by using, as a weight coefficient, a photon number ratio obtained from an energy spectrum of the radiation.

9. The photon counting circuit according to claim 1, wherein the subpixels are divided into a plurality of groups, and the threshold values of the subpixels are selected so as to minimize a difference between the target threshold value and an average of threshold values of the respective groups.

10. The photon counting circuit according to claim 9, wherein the groups are three groups of corner subpixels that are subpixels located at corners of the pixel, edge subpixels that are subpixels located on edges of the pixel, and a subpixel except for the corner subpixels and the edge subpixels.

11. The photon counting circuit according to claim 10, wherein the corner subpixels are divided into two of diagonally opposite corners, and the edge subpixels are divided into two of opposite edges.

12. A radiographic imaging apparatus, comprising:
a radiation source for irradiating an object with radiation; and
a detection element module for detecting the radiation,
wherein the detection element module has the photon counting circuit according to claim 1.

13. The radiographic imaging apparatus according to claim 12, further comprising a display portion for displaying a display window that has a pixel map showing a location of a pixel a threshold value of which falls out of an allowable range, and a subpixel map showing a state of threshold values of subpixels making up a pixel selected.

14. A threshold setting method for setting threshold values for subpixels of a radiographic imaging apparatus that includes a radiation source for irradiating an object with radiation and a detection element module having a photon counting circuit for counting, for each pixel, electrical charges generated depending on photon energy of the radiation, the pixel being divided into a plurality of the subpixels,
the threshold setting method comprising the step of:
when N is a natural number, selecting a threshold value of each of the subpixels from among top N discrete values of a plurality of discrete values arranged in order of proximity to a target threshold value corresponding to the photon energy so as to minimize a difference between the target threshold value and an average of the threshold values of the respective subpixels included in the pixel.

* * * * *